United States Patent [19]

Frederick

[11] Patent Number: 5,002,100
[45] Date of Patent: Mar. 26, 1991

[54] BATTERY FILLER APPARATUS

[76] Inventor: Patrick Frederick, 3380 Shadow Tree Dr. #415, Sacramento, Calif. 95834

[21] Appl. No.: 475,389

[22] Filed: Feb. 5, 1990

[51] Int. Cl.$^5$ ............................ B65B 1/04; B67C 3/00
[52] U.S. Cl. .................................... 141/35; 141/198; 141/238; 141/242
[58] Field of Search ..................... 141/35, 94, 95, 96, 141/99, 198, 199, 206, 210, 211, 212, 213, 216, 236, 238, 242, 243, 244

[56] References Cited

U.S. PATENT DOCUMENTS

| | | | |
|---|---|---|---|
| 3,189,063 | 6/1965 | Lowe | 141/35 |
| 3,534,785 | 10/1970 | Bensen | 141/198 |
| 3,880,209 | 4/1975 | Haughn et al. | 141/198 |
| 3,988,857 | 11/1976 | Baumann | 141/95 |
| 4,007,764 | 2/1977 | Bandemor | 141/35 |
| 4,165,769 | 8/1979 | Hoffman | 141/198 |
| 4,289,176 | 9/1981 | Evans | 141/35 |
| 4,353,968 | 10/1982 | Boyle | 141/35 |
| 4,359,075 | 11/1982 | Eberle et al. | 141/238 |
| 4,696,874 | 9/1987 | Tadiello | 141/199 |
| 4,829,002 | 5/1989 | Pattillo et al. | 141/244 |

*Primary Examiner*—Henry J. Recla
*Assistant Examiner*—Keith Kupferschmid
*Attorney, Agent, or Firm*—Leon Gilden

[57] ABSTRACT

An apparatus including a reservoir mounted for gravity feed overlying an associated battery, wherein the battery includes a plurality of cell openings, with a valve member mounted within each cell opening, wherein each valve member is in fluid communication with a reservoir. Each valve member includes a reciprocatable indicator mounted within the valve member extending into the cell, wherein the indicator member includes a lower float portion to direct an indicator member reciprocatably within a transparent portion of the valve for visual indication of a need or lack thereof for additional water to be directed into an associated cell of the battery.

8 Claims, 4 Drawing Sheets

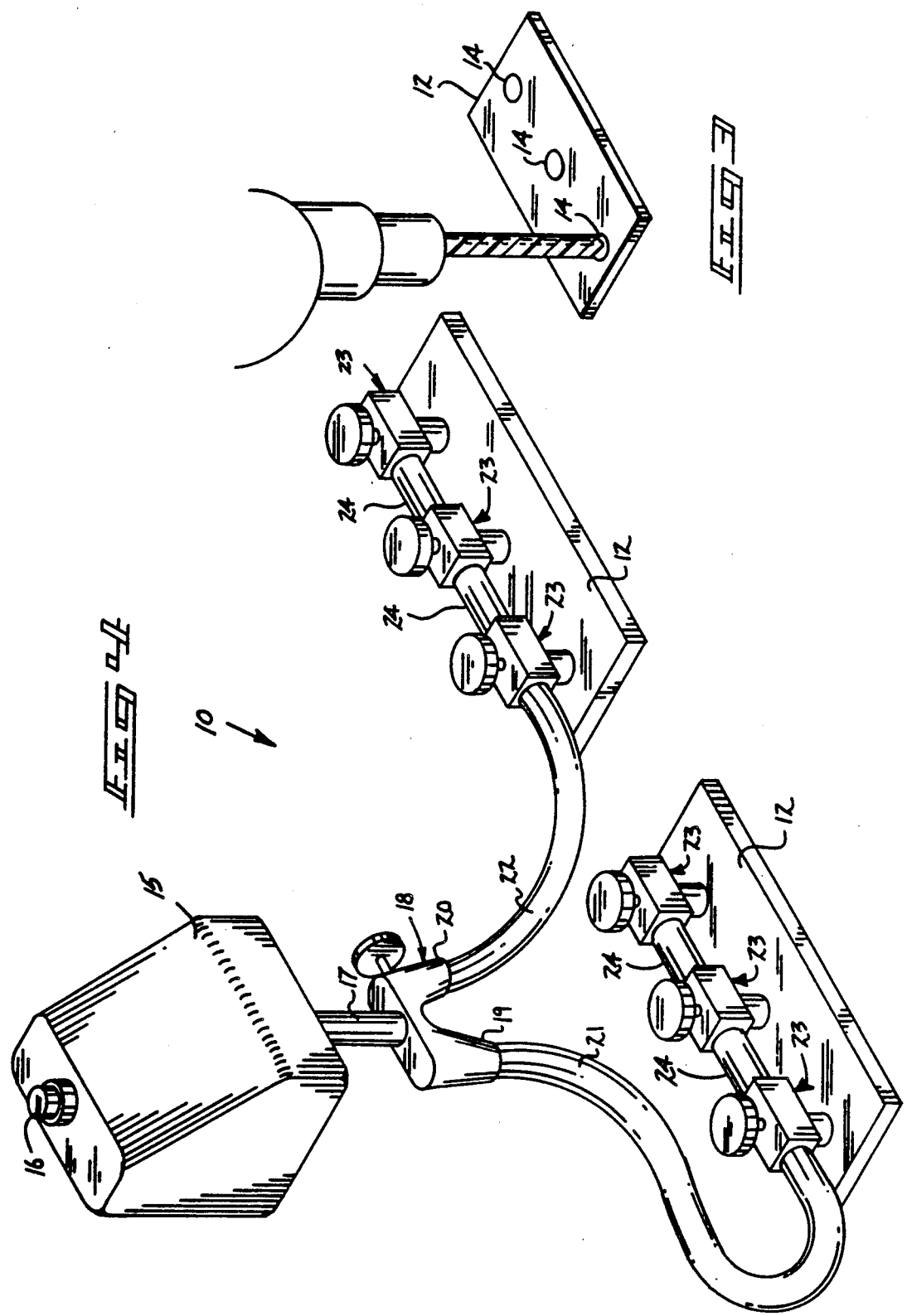

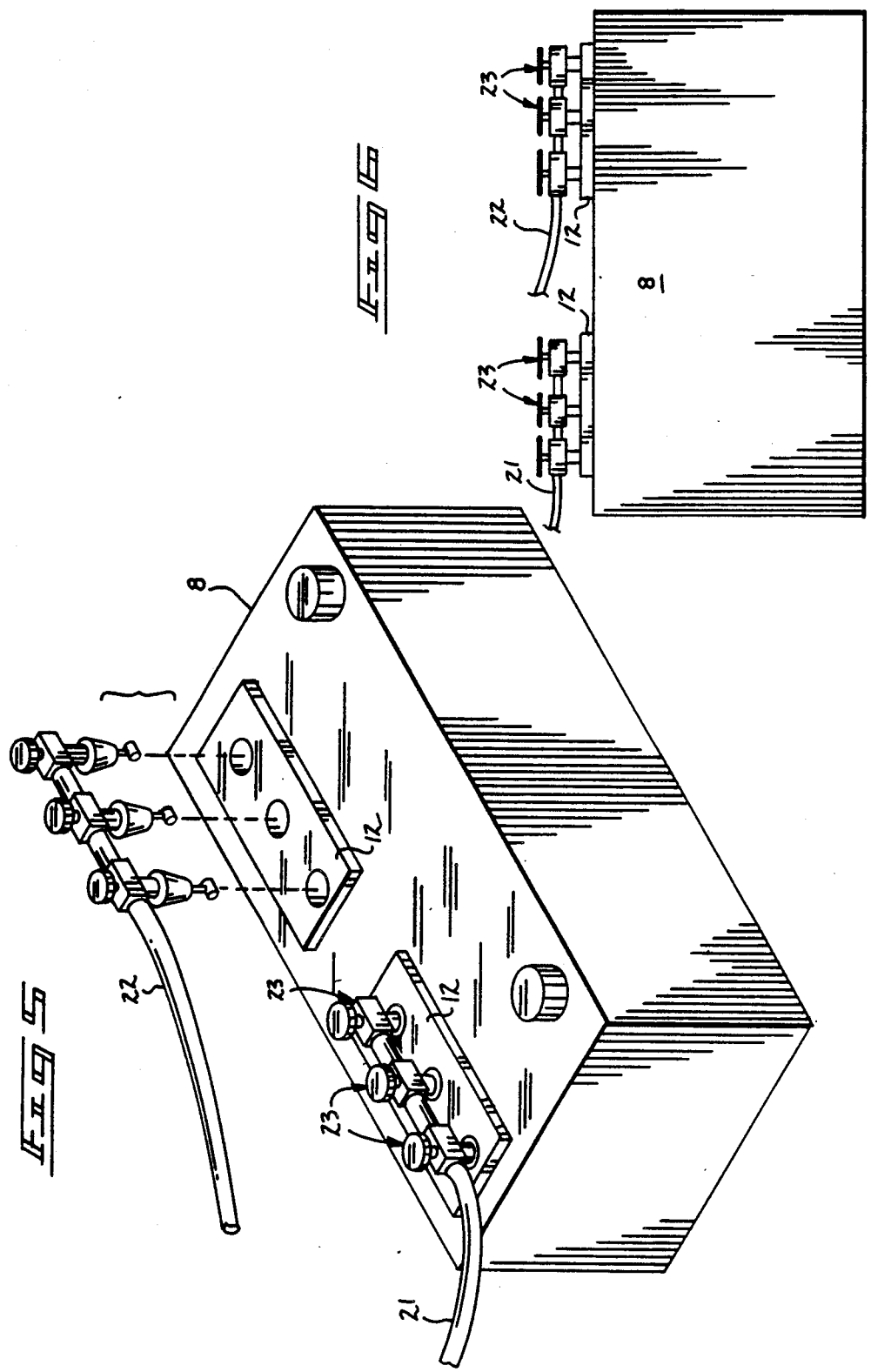

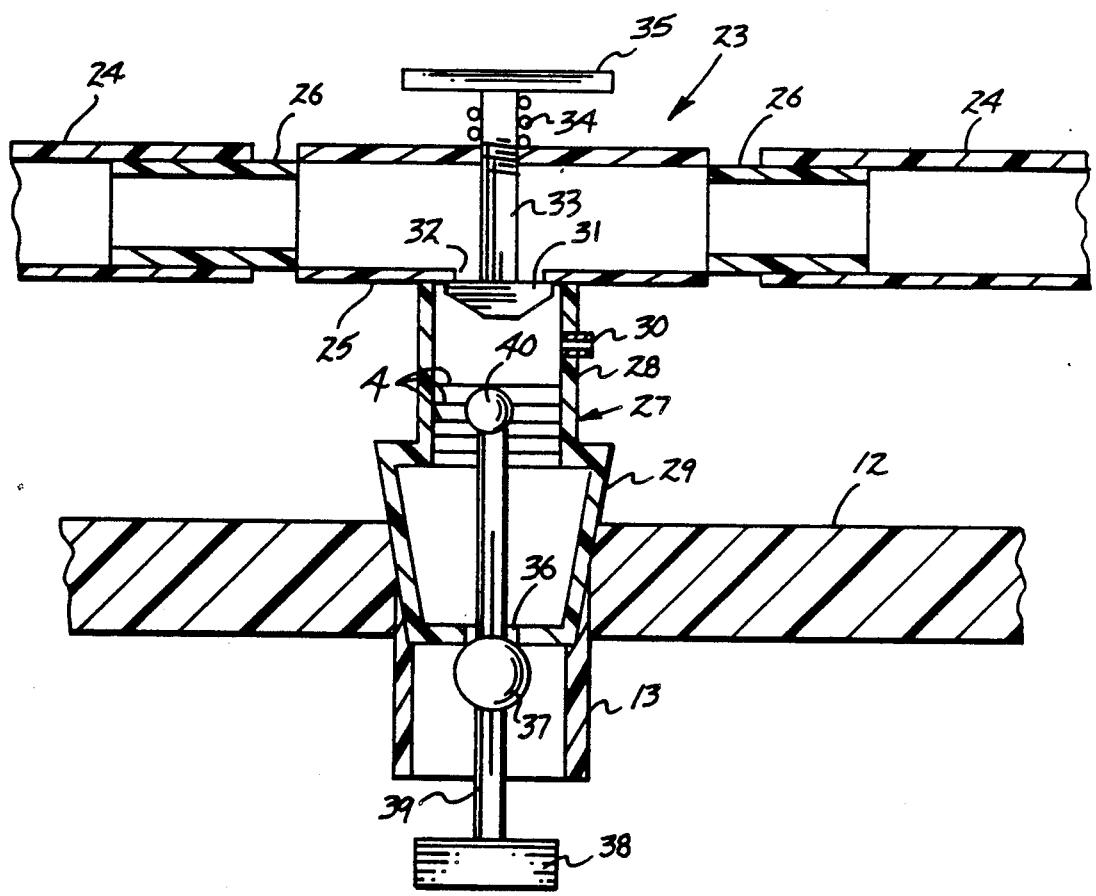

BATTERY FILLER APPARATUS

BACKGROUND OF THE INVENTION

1. Field of the Invention

The field of invention relates to battery filling apparatus, and more particularly pertains to a new and improved battery filler apparatus wherein the same easily and conveniently fills a battery, with a reservoir overlying an associated battery by gravity feeding, including an indicator means for indication of need of fluid within a battery.

2. Description of the Prior Art

Prior art apparatus has been developed for replenishment of water within a battery, but this apparatus has heretofore been of a relatively complex and expansive organization and not subject to utilization by individuals. Periodic replenishment of water fluid within a battery cell is desirable to maintain optimum operating efficiency of a particular battery, wherein the instant invention attempts to overcome the deficiencies of the prior art by providing a battery filler apparatus of convenient and compact organization to effect this goal. Examples of the prior art include U.S. Pat. No. 4,007,764 to Bandemor wherein a reservoir is operative through a central valve to a plurality of fill members, wherein each fill member includes a tube to direct fluid into the cell of the associated battery, and wherein the reservoir is replenished by means of a pump operative through a fluid sump collector.

U.S. Pat. No. 3,880,209 to Haughn sets forth a battery cell water filling device utilizing a circuit to deactivate a pump in the filling in an industrial environment of an associated battery.

U.S. Pat. No. 3,189,063 to Lowe sets forth the use of a battery watering device utilizing a relatively complex valve structure in association with a reservoir for filling of the battery.

U.S. Pat. No. 4,289,176 to Evans illustrates a battery filling device with a pump that draws liquid from a reservoir and is operative through various valving to direct water or a water acid solution into various cells of an associated battery.

U.S. Pat. No. 3,534,785 to Bensen sets forth a battery filling apparatus wherein a pump draws fluid from an associated reservoir to individually fill battery cells of a battery in a one-at-a-time manner.

As such, it may be appreciated that there continues to be a need for a new and improved battery filling apparatus wherein the same addresses both the problems of ease of use, as well as effectiveness in construction and in this respect, the present invention substantially fulfills this need.

SUMMARY OF THE INVENTION

In view of the foregoing disadvantages inherent in the known types of battery filling apparatus now present in the prior art, the present invention provides a battery filling apparatus wherein the same provides for a visual indication to permit directing of fluid into individual cells of a storage battery. As such, the general purpose of the present invention, which will be described subsequently in greater detail, is to provide a new and improved battery filling apparatus which has all the advantages of the prior art battery filling apparatus and none of the disadvantages.

To attain this, the present invention provides an apparatus including a reservoir mounted for gravity feed overlying an associated battery, wherein the battery includes a plurality of cell openings, with a valve member mounted within each cell opening, wherein each valve member is in fluid communication with a reservoir. Each valve member includes a reciprocatable indicator mounted within the valve member extending into the cell, wherein the indicator member includes a lower float portion to direct an indicator member reciprocatably within a transparent portion of the valve for visual indication of a need or lack thereof for additional water to be directed into an associated cell of the battery.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved battery filling apparatus which has all the advantages of the prior art battery filling apparatus and none of the disadvantages.

It is another object of the present invention to provide a new and improved battery filling apparatus which may be easily and efficiently manufactured and marketed.

It is a further object of the present invention to provide a new and improved battery filling apparatus which is of a durable and reliable construction.

An even further object of the present invention is to provide a new and improved battery filling apparatus which is susceptible of a low cost of manufacture with regard to both materials and labor, and which accordingly is then susceptible of low prices of sale to the consuming public, thereby making such battery filling apparatus economically available to the buying public.

Still yet another object of the present invention is to provide a new and improved battery filling apparatus which provides in the apparatuses and methods of the prior art some of the advantages thereof, while simultaneously overcoming some of the disadvantages normally associated therewith.

Still another object of the present invention is to provide a new and improved battery filling apparatus wherein the same enables visual indication to permit replenishment of individual cells of an associated battery.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of a drilling procedure effected to a battery plate.

FIG. 4 is an isometric illustration of the instant invention.

FIG. 5 is an isometric illustration of the instant invention in association with a battery.

FIG. 6 is an orthographic side view taken in elevation of the instant invention valving associated with a battery.

FIG. 7 is an orthographic cross-sectional view of a valve member utilized by the instant invention.

DESCRIPTION OF THE PREFERRED EMBODIMENT

Figure 1:
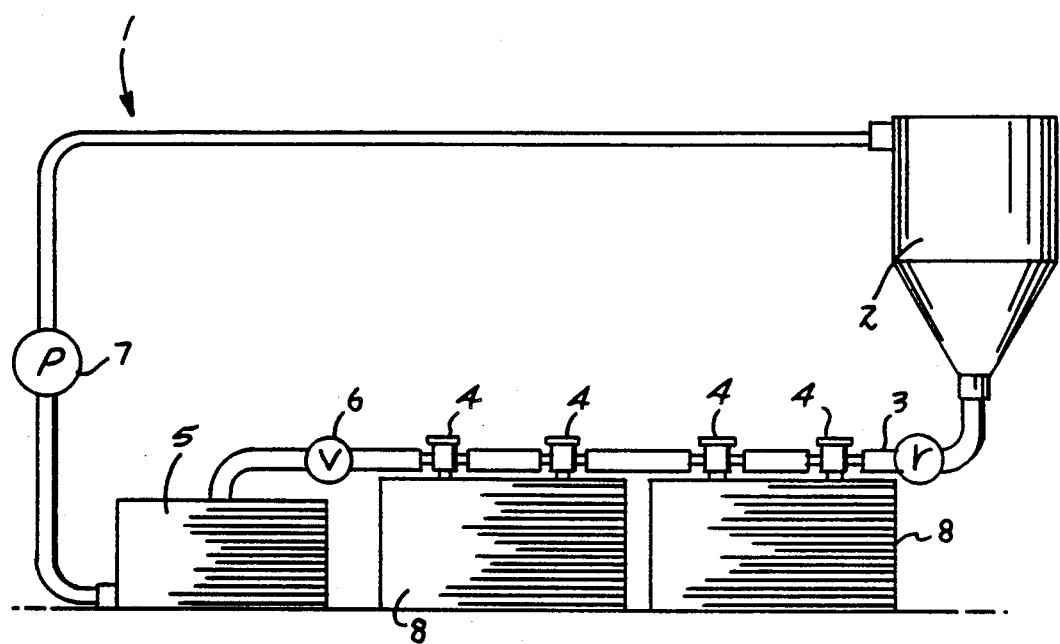
FIG. 1 is an orthographic side view taken in elevation of a prior art battery filling apparatus.

With reference now to the drawings, and in particular to FIGS. 1 to 7 thereof, a new and improved battery filling apparatus embodying the principles and concepts of the present invention and generally designated by the reference numeral 10 will be described.

Figure 2:
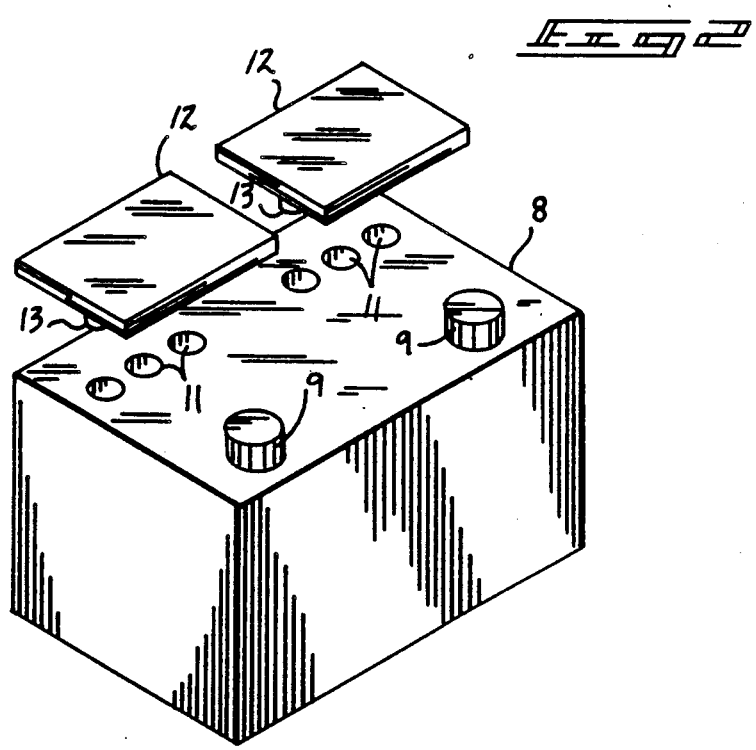
FIG. 2 is an isometric illustration of a conventional battery as utilized by the instant invention.

FIG. 1 is illustrative of a prior art battery filling apparatus 1 wherein a reservoir 2 overlies a battery pair 8. The reservoir 2 is operative through a conduit 3 containing a first valve to direct battery filling fluid through a series of battery fill members 4. The battery fill members are in fluid communication with one another and terminate in a subvalve 6 cooperating with a sump member 5. A pump 7 directs and recycles fluid from the sump 5 into the reservoir 2. FIG. 2 illustrates a typical battery 8 utilized, wherein a plurality of spaced terminals 9 are spaced from a series of aligned battery cell openings 11. The battery cell openings are covered by utilization of spaced battery plates 12, wherein the battery plates include vented cell plugs 13 to be secured within the aligned cells 11.

More specifically, the battery filling apparatus 10 (as illustrated in FIG. 4 for example) includes a fluid reservoir 15, wherein the reservoir 15 includes a removable cap 16 to enable periodic replenishment of fluid within the reservoir 15 to direct either a water or a water/acid solution into an associated battery 8. The reservoir 15 includes a downwardly directed first conduit 17 in fluid communication with the reservoir 15, wherein the first conduit 17 is directed into a bifurcated valve 18 that enables selective directing of the fluid from the reservoir 15 into a first and second leg 19 and 20 respectively upon opening of the valve 18. The first leg includes a first flexible supply hose 21, wherein the second leg includes a second flexible supply hose 22, wherein each flexible supply hose directs fluid from the reservoir 15 through the bifurcated valve 18 into a respective aligned series of valve members 23 mounted to a respective cover plate 12 in an aligned relationship. The valves 23 are mounted through drilled openings 14 formed within the respective plates 12 to receive a lower transparent conduit housing 27 of each of the valve members 23. The valve members 23 are in fluid communication with one another through coaxially aligned coupler conduits 24 securing respective adjacent valve members 23 together. The couple conduits 24 are secured to a central horizontal conduit housing 25 of each valve member 23, wherein each central conduit housing 25 includes a hose nipple 26 coaxially aligned through each end of the central conduit housing 25 to receive the coupler conduit 24 thereon. Each valve member 23 includes an aligned pair of such hose nipples 26, with the exclusion of the end valve member of the series of the valve members remote from each respective flexible supply hose 21 or 22.

Reference to FIG. 7 illustrates details of each valve member 23 as it is sealingly mounted through each drill opening 14 coaxially aligned with each of the cell plugs 13. The valve members 23 include a transparent lower conduit housing 27, as noted above, orthogonally mounted and in fluid communication with the central horizontal conduit housing 25. The lower conduit housing 27 includes a tubular upper housing 28 that includes a valve opening 32 therethrough, with the valve opening 32 defining a diameter less than that of an internal diameter defined by the tubular upper housing 28. A valve head 31 is positioned between the valve opening 32 and the upper housing 28 to selectively enable directing of fluid from the central conduit housing 25 through the lower conduit housing 27. The valve head 31 includes a threaded stem 33 threadedly received in threaded communication with companion threads formed through an upper surface of the conduit housing 25. The threaded stem is directed upwardly and exteriorly of an external wall of the central conduit housing 25, with a spring member 34 captured between the exterior wall surface of the central conduit housing 25 and a bottom surface of a valve handle 35 to maintain positioning of the valve head 31 in an open or closed orientation relative to the valve opening 32. The spring 34 thereby serves as a friction detent to maintain a relative rotative position of the threaded stem 33 relative to the opening 32 upon manual rotation of the stem 33.

The transparent lower conduit housing 27 is coaxially aligned and in fluid communication with a hollow truncated conical valve housing 29 that is secured within a sealing relationship relative to the openings 14. A check ball opening 36 is formed through a floor of the conical lower housing 29 and is of an opening diameter less than that defined by a check ball 37. The check ball 37 is mounted to a float rod 39, with a float 38 mounted at a lower terminal end of the rod 39. The rod 39 extends coaxially through the check ball 37 and terminates at an upper end in a brightly colored indicator member 40. The indicator member 40 is visible through the tubular upper housing 28 and is visible through a series of annular gradations 41 formed throughout the upper housing 28. A vent tube 30 is formed through the side wall of the tubular transparent upper housing 28 to permit normal venting of gases generated from within each battery cell.

When fluid within one of the battery cells drops below a desired level, the float 38 drops and with it the associated indicator member 40. The indicator member 40 also is of a sizing to deny passage through the check ball opening 36, whereupon replenishment of fluid by opening of the valve head 31 by rotation of the associated valve handle 35 permits directing of fluid within each cell, whereupon the float 38 will rise upon proper amount of fluid being positioned within each battery cell, whereupon the valve head 31 may be rotated into a sealing relationship relative to the valve opening 32. This procedure is repeated for each battery cell within the battery 8.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A battery filling apparatus in combination with a storage battery, wherein the storage battery includes,
    a battery fluid therewith, and
    the storage battery including a series of individual cells directed through the battery in communication with the battery fluid, wherein each cell includes a cell opening, the apparatus comprising,
    a reservoir, including a reservoir conduit in fluid communication with the reservoir, and
    a reservoir valve mounted to the reservoir conduit, and
    a hose member mounted to the reservoir valve at a forward end of the hose member, and
    the hose member including a rear end mounted to a first battery valve member, the first battery valve member mounted within a first cell opening of the cell openings, and
    the first battery valve member in fluid communication with a plurality of battery valve members, and
    wherein the reservoir valve is defined as a bifurcated valve including a first leg mounted to the hose member, and a second leg mounted to a further hose member, the first hose member mounted to the first valve member of the plurality of valve members, and the second hose member mounted to a further first valve member mounted to a further plurality of valve members, and
    wherein each valve member includes a horizontally disposed conduit housing and a transparent lower housing orthogonally and in fluid communication with the horizontal conduit housing, the transparent conduit housing including a tubular upper housing and a truncated conical lower housing, the truncated lower housing including a floor, the floor including a floor aperture therethrough, and
    a float rod mounted through the floor aperture and extending below the floor aperture terminating in a lower end, with a float member mounted to the lower end, and a check ball mounted to the float road below the floor aperture, and the float rod extending coaxially and longitudinally beyond the check ball terminating in an upper end, the upper end including a brightly colored indicator member mounted thereon.

2. An apparatus as set forth in claim 1 wherein the transparent upper housing includes a vent tube directed therethrough.

3. An apparatus as set forth in claim 2 wherein the horizontal conduit housing includes a valve opening directed through a bottom surface thereof, the valve opening including a valve head in communication therewith, the valve head including a valve stem directed upwardly of the valve head and directed through an upper surface of the horizontal conduit housing, wherein the valve stem is formed with threads thereabout in communication with threads formed through the upper surface of the conduit housing to permit opening and closing of the valve head relative to the valve opening.

4. An apparatus as set forth in claim 3 wherein the transparent upper housing includes a series of annular gradations formed about the upper transparent housing for relative indication of the indicator member relative to the gradations for indication of a battery fluid level contained within each respective cell of the battery.

5. An apparatus as set forth in claim 3 wherein each horizontal conduit housing includes a nipple member coaxially mounted and in fluid communication with the horizontal conduit housing, the nipple member of the first valve member and of the further first valve member in fluid communication with the hose member and the further hose member.

6. An apparatus as set forth in claim 5 wherein the hose member and the further hose member are flexible to permit relative positioning of the reservoir relative to the valve members.

7. An apparatus as set forth in claim 6 wherein the check ball is defined by a predetermined diameter, and the floor aperture through the conical lower housing is defined by a further predetermined diameter, wherein the predetermined diameter is greater than that of the further predetermined diameter to deny passage of the check ball upwardly through the floor aperture.

8. An apparatus as set forth in claim 7 wherein the indicator member is defined by a predetermined width greater than the further predetermined diameter.

* * * * *